(12) United States Patent
Kojima et al.

(10) Patent No.: US 6,341,819 B1
(45) Date of Patent: Jan. 29, 2002

(54) SEAT SLIDE DEVICE FOR A VEHICLE

(75) Inventors: Yasuhiro Kojima, Kariya; Yukifumi Yamada, Toyota, both of (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/472,428

(22) Filed: Dec. 27, 1999

(30) Foreign Application Priority Data

Dec. 25, 1998 (JP) ............................................ 10-368677

(51) Int. Cl.⁷ ................................................ A47C 1/02
(52) U.S. Cl. ..................... 297/341; 297/344.1; 248/429
(58) Field of Search ............................. 297/341, 344.1, 297/317, 318; 248/429, 430, 419, 423

(56) References Cited

U.S. PATENT DOCUMENTS

| 4,742,983 A | * | 5/1988 | Nihei ...................... 297/341 X |
| 5,740,999 A | | 4/1998 | Yamada |
| 5,882,074 A | | 3/1999 | Kojima |
| 6,048,030 A | * | 4/2000 | Kanda et al. ................ 297/341 |
| 6,149,237 A | * | 11/2000 | Morishita et al. ........ 297/341 X |

FOREIGN PATENT DOCUMENTS

| DE | 197 32 853 | 2/1998 |
| DE | 195 24 166 | 3/1998 |
| EP | 0 135 596 | 4/1985 |
| JP | 3/1995 | 3/1995 |

* cited by examiner

Primary Examiner—Laurie K. Cranmer
(74) Attorney, Agent, or Firm—Burns, Doane, Swecker & Mathis, LLP (57) ABSTRACT

A seat device for a vehicle includes a seat slide device supporting a vehicle seat relative to the vehicle floor at a position that is slidably adjustable in a back and forth direction on the vehicle floor, a lock plate engageable with the seat slide device to hold the seat at a position on the vehicle floor, a release lever rotatably supported on the seat slide device for releasing engagement of the lock plate with the seat slide device to permit sliding movement of the vehicle seat, and a walk-in mechanism having a hold lever for engaging the release lever to control rotation of the release lever when the release lever engages the lock plate. The rotation of the hold lever pivotally supported on the seat slide device is controlled by the engagement between the lock plate and the seat slide device so that when the lock plate is out of engagement with the seat slide device and the vehicle seat moves forwardly, rotation of the hold lever is permitted. By making the engagement lapping portion between the release lever and the lock plate be constant and also the spring force applied to them constant, the engagement or disengagement timing of them is improved to be relatively constant. Thus, the resumed position of the seat can be constant.

15 Claims, 9 Drawing Sheets

SEAT SLIDE DEVICE FOR A VEHICLE

This application is based on and claims priority under 35 U.S.C. § 119 with respect to Japanese Application No. 10(1998)-368677 filed on Dec. 25, 1998, the entire content of which is incorporated herein by reference.

FIELD OF THE INVENTION

The present invention generally relates to a seat device. More particularly, the present invention pertains to a seat device in which a walk-in mechanism is provided for resuming a predetermined seat position after adjusting the seat position upon passengers entering or exiting the rear seat in cooperation with seat reclining forward adjustment of the seat back with respect to the seat cushion.

BACKGROUND OF THE INVENTION

Unexamined Published Japanese Patent Application (Kokai) No. H07 (1995)-81469 discloses a seat slide device for sliding the seat device back and forth on a vehicle floor, a lock plate for holding the seat device in the adjusted position on the floor by engaging the seat slide device with the lock plate, a release lever for releasing the engagement between the lock plate and the seat slide mechanism through operation of the release lever, and a hold member for controlling the operation of the release lever through engagement with the release lever when the lock plate engages the release lever.

The hold member includes a cantilever spring for causing the hold member to engage with the release lever. By bending the cantilever spring, the hold member can be disengaged from the release lever. However, the cantilever spring generally has a wide distribution of spring force characteristics. Also the spring force characteristics tend to degrade over time. This can bring about an unstable engagement overlapping portion and an unstable disengagement timing between the hold member and the release lever. As a result, it is very difficult to produce an accurate resumed seat position on the vehicle floor.

A need thus exists for a seat slide device for a vehicle which is not as susceptible to the drawbacks and disadvantages noted above.

SUMMARY OF THE INVENTION

In light of the foregoing, one aspect of the present invention involves a seat device for a vehicle that includes a seat slide device supporting a vehicle seat relative to the vehicle floor at a position that is slidably adjustable in a back and forth direction on the vehicle floor, a lock plate engageable with the seat slide device to hold the seat at a position on the vehicle floor, a release lever rotatably supported on the seat slide device for releasing engagement of the lock plate with the seat slide device to permit sliding movement of the vehicle seat, and a walk-in mechanism having a hold lever for engaging the release lever to control rotation of the release lever when the release lever engages the lock plate.

According to another aspect of the invention, a seat device for a vehicle includes a lower rail secured to the vehicle floor and an upper rail supporting a vehicle seat and slidably supported on the lower rail, a lock plate engageable with the upper rail to fix the upper rail with respect to the lower rail and hold the vehicle seat at a position with respect to the vehicle floor, a release lever rotatably supported on the seat slide device for releasing engagement of the lock plate with the upper rail to permit sliding movement of the vehicle seat, a spring secured to the upper rail to move the upper rail in a forward direction with respect to the lower rail when the engagement of the lock plate with the upper rail is released by the release lever, and a hold lever movable between one position in which the hold lever engages the release lever to prevent rotation of the release lever and another position in which the hold lever is out of engagement with the release lever to permit rotation of the release lever.

BRIEF DESCRIPTION OF THE DRAWING FIGURES

The foregoing and additional features of the present invention will become more apparent from the following detailed description considered with reference to the accompanying drawing figures in which like elements are designated by like reference numerals and wherein.

DETAILED DESCRIPTION OF THE INVENTION

Figure 1:
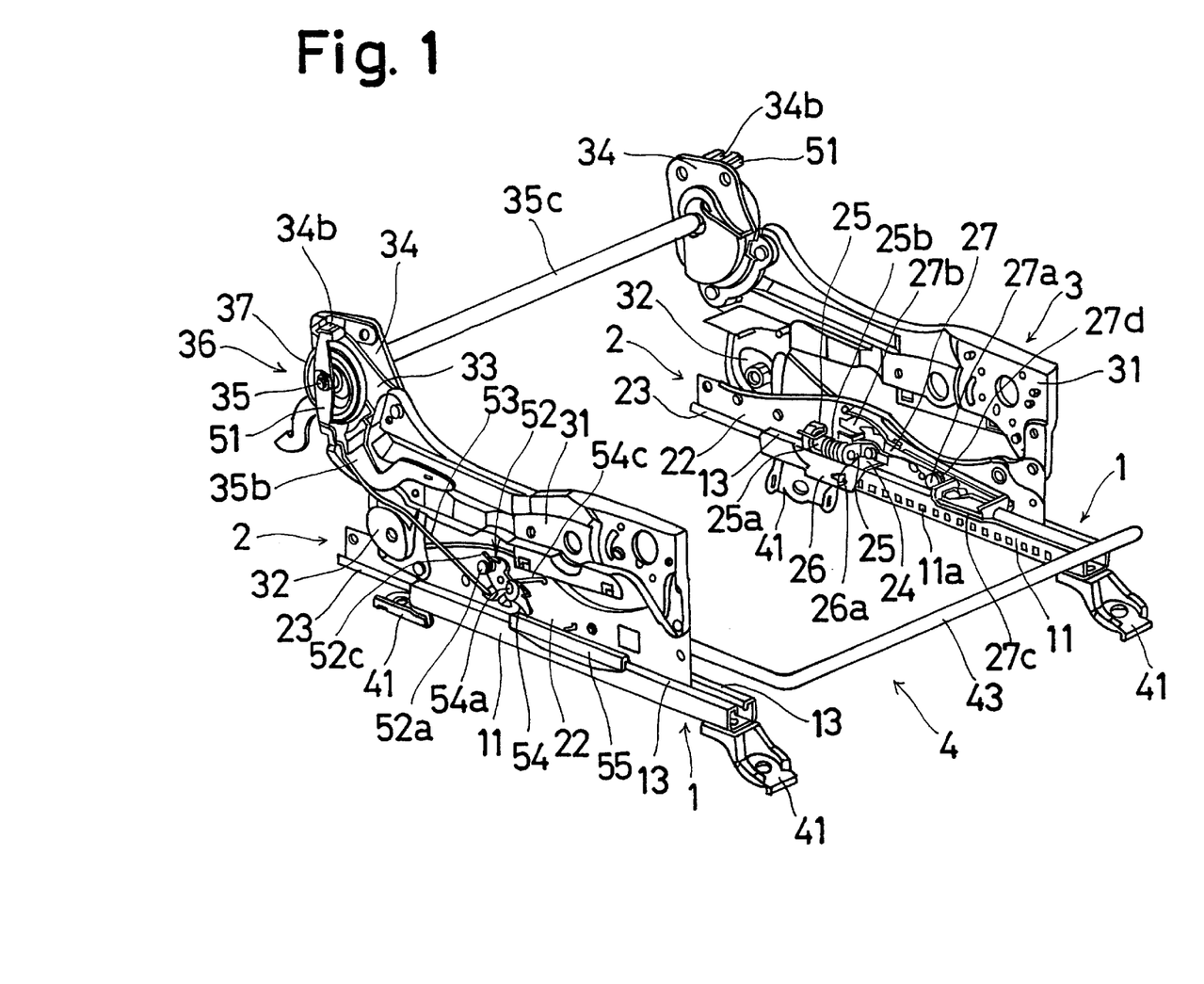
FIG. 1 is a perspective view of the seat device in accordance with the present invention.
Figure 2:
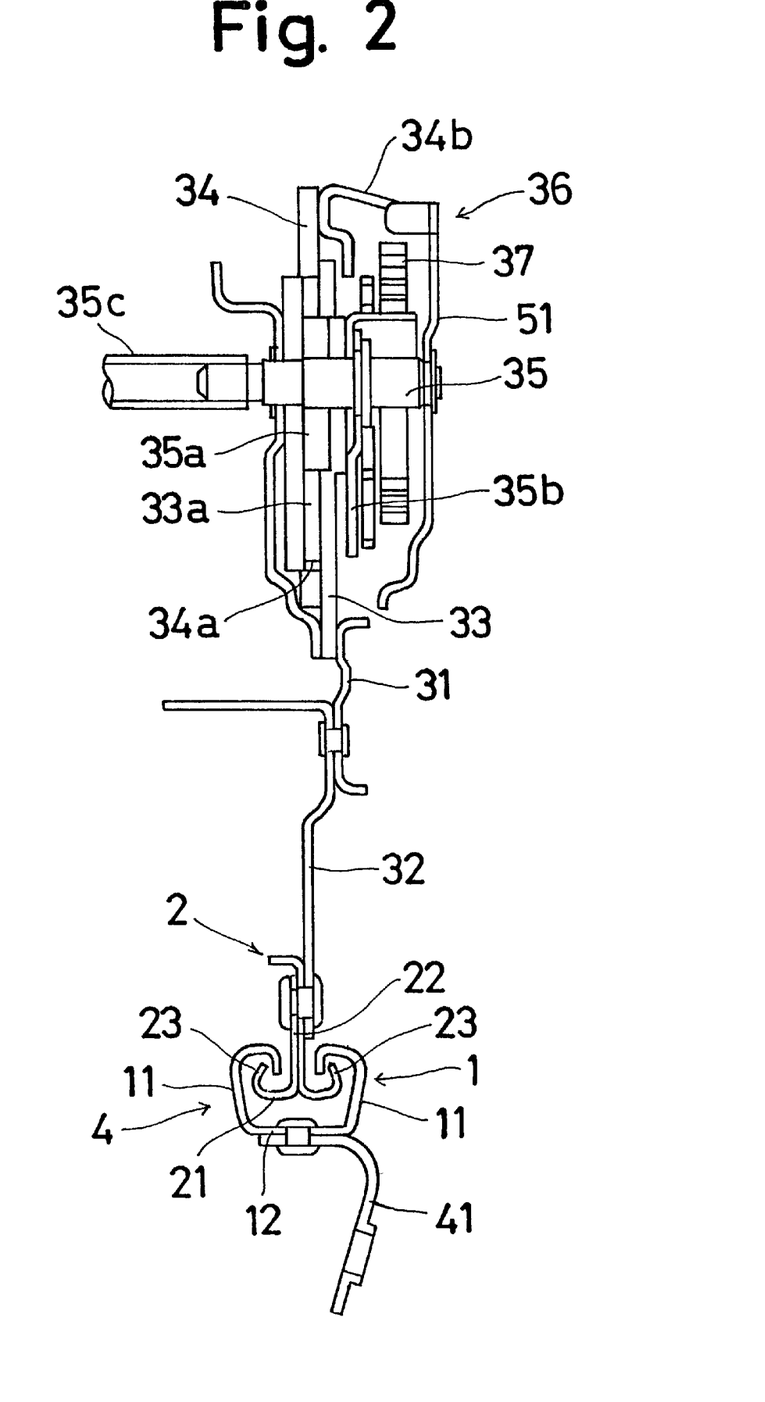
FIG. 2 is a cross-sectional view of the seat slide device of the present invention shown in FIG. 1.
Figure 3:
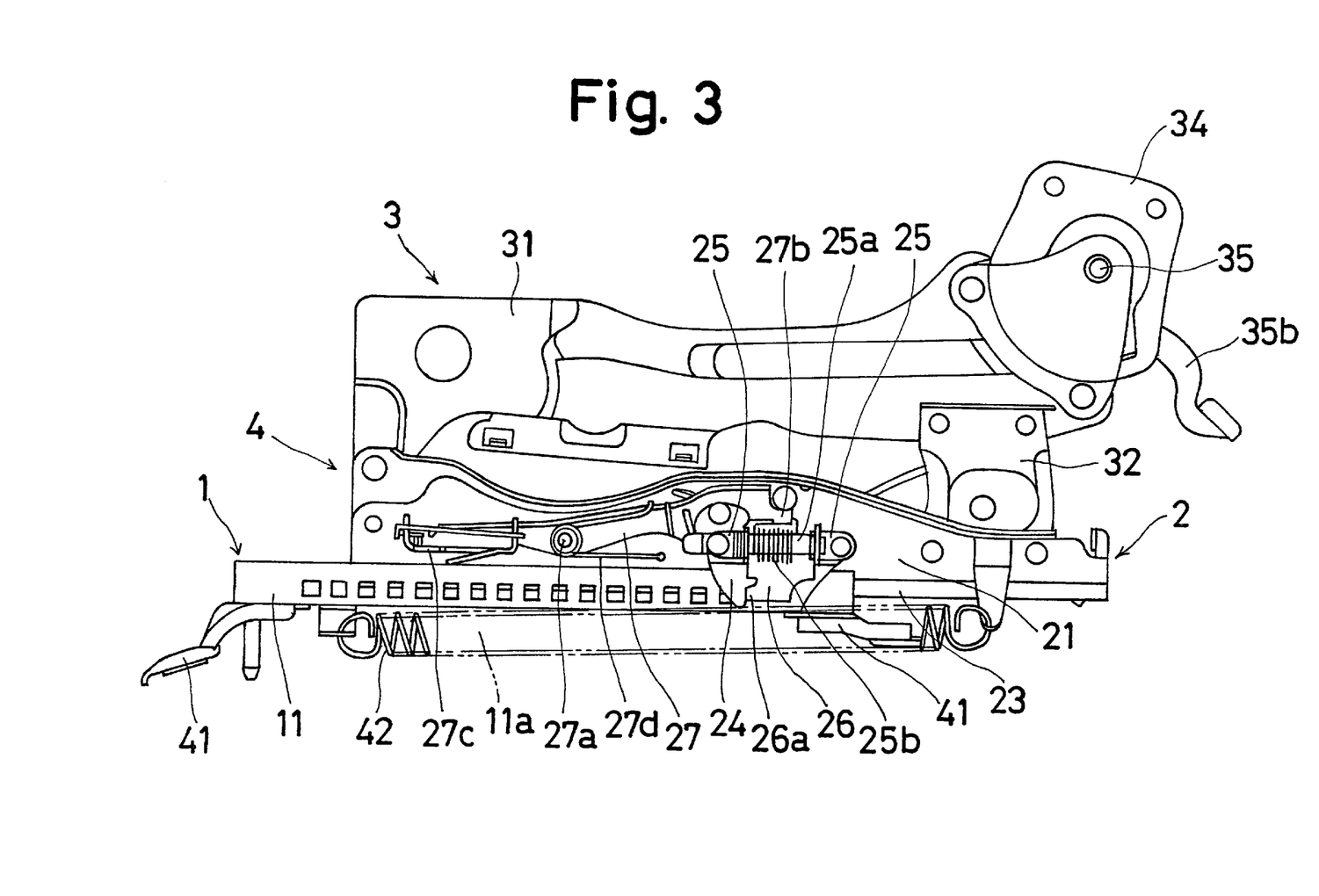
FIG. 3 is a side view of the seat slide device in accordance with the present invention.

As shown in FIGS. 1–3, the seat slide device 4 in accordance with the present invention includes a pair of lower rails 1, each of which is fixed to the vehicle floor. The lower rails include right and left lower rails arranged parallel to each other and secured to the vehicle floor by brackets 41. The lower rails 1, 1 each possess a U-shaped cross-section defined by a pair of side wall portions 11 and a base portion 12 connecting the side wall portions 11. The lower rails are elongated in the forward and rearward direction of the vehicle. Engagement flange portions 13 are formed on the lower rails 1, 1 and extend longitudinally along the lower rails 1. The engagement flange portions 13, 13 are spaced apart by a predetermined distance from each other, with each engagement flange portion 13 extending from the upper end of one of the side wall portions 11 and bending toward the inside of the lower rail 1.

Figure 4:
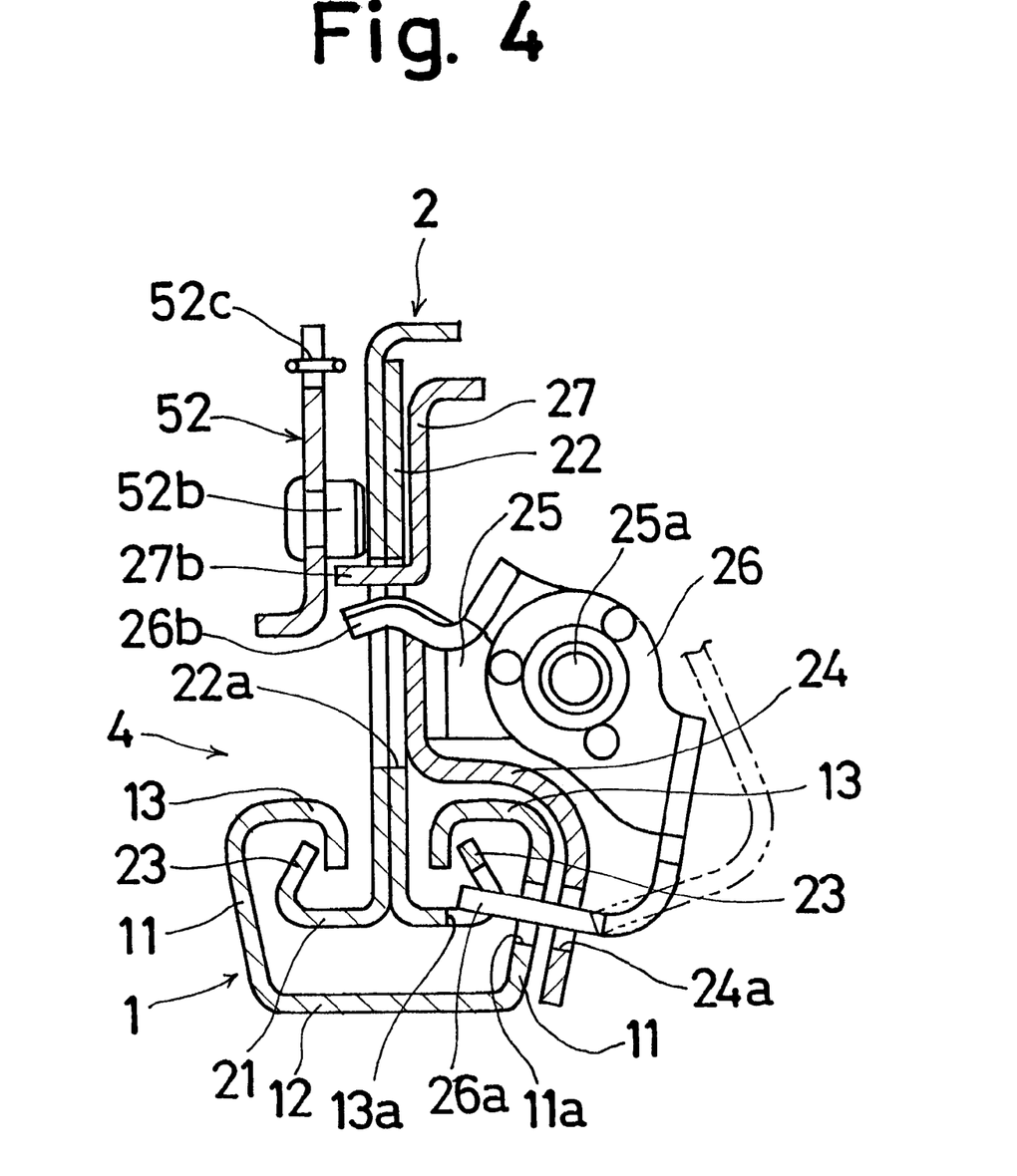
FIG. 4 is a cross-sectional view of a portion of the seat slide device in the region the seat slide lock mechanism shown in FIG. 3.

A pair of upper rails 2 that are elongated in the forward and rearward direction of the vehicle are each slidably supported on a respective one of the lower rails 1. The upper rails 2 form right and left upper rails that are fixed by way of brackets 32 on the seat cushion frame 31 forming a part of the seat cushion of the vehicle seat 3. The cross-section of each upper rail 2 possesses an upside-down T-shaped configuration having a horizontal portion 21 and a vertical portion 22. Engagement flange portions 23 forming a part of the upper rail 2 extend from both edges of the upper rail horizontal portion 21. The engagement flange portions 23 are bent upward as seen in FIG. 4. The engagement flange portions 23 of the upper rail 2 engage the engagement flange portions 13 of the lower rail 1 through the intermediary of slide permitting elements (e.g. balls) that permit sliding movement between the upper and lower rails. Thus, each upper rail 2 is slidable supported on the respective lower rail 1 as to be able to slide back and forth. The horizontal portion 21 of the upper rail 2 is arranged parallel to the base portion 12 of the lower rail 1 by way of further slide permitting members (e.g., rollers). Also, as shown in FIGS. 2 and 4, the vertical portion 22 of the upper rail 2 extends upward between the engagement flange portions 13 of the lower rail 1.

Figure 5:
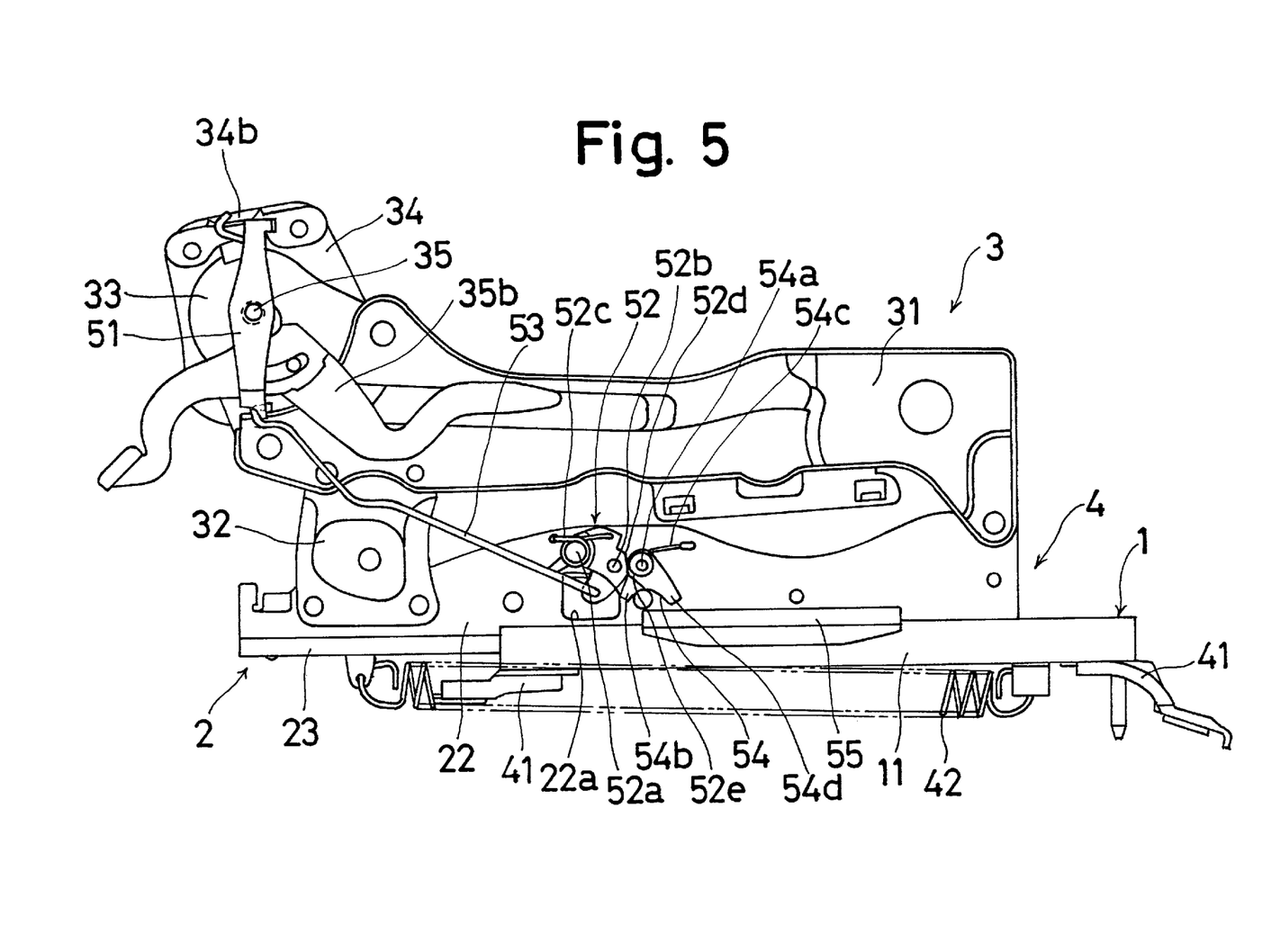
FIG. 5 is an inner side view of the seat slide device in accordance with the present invention.
Figure 6:
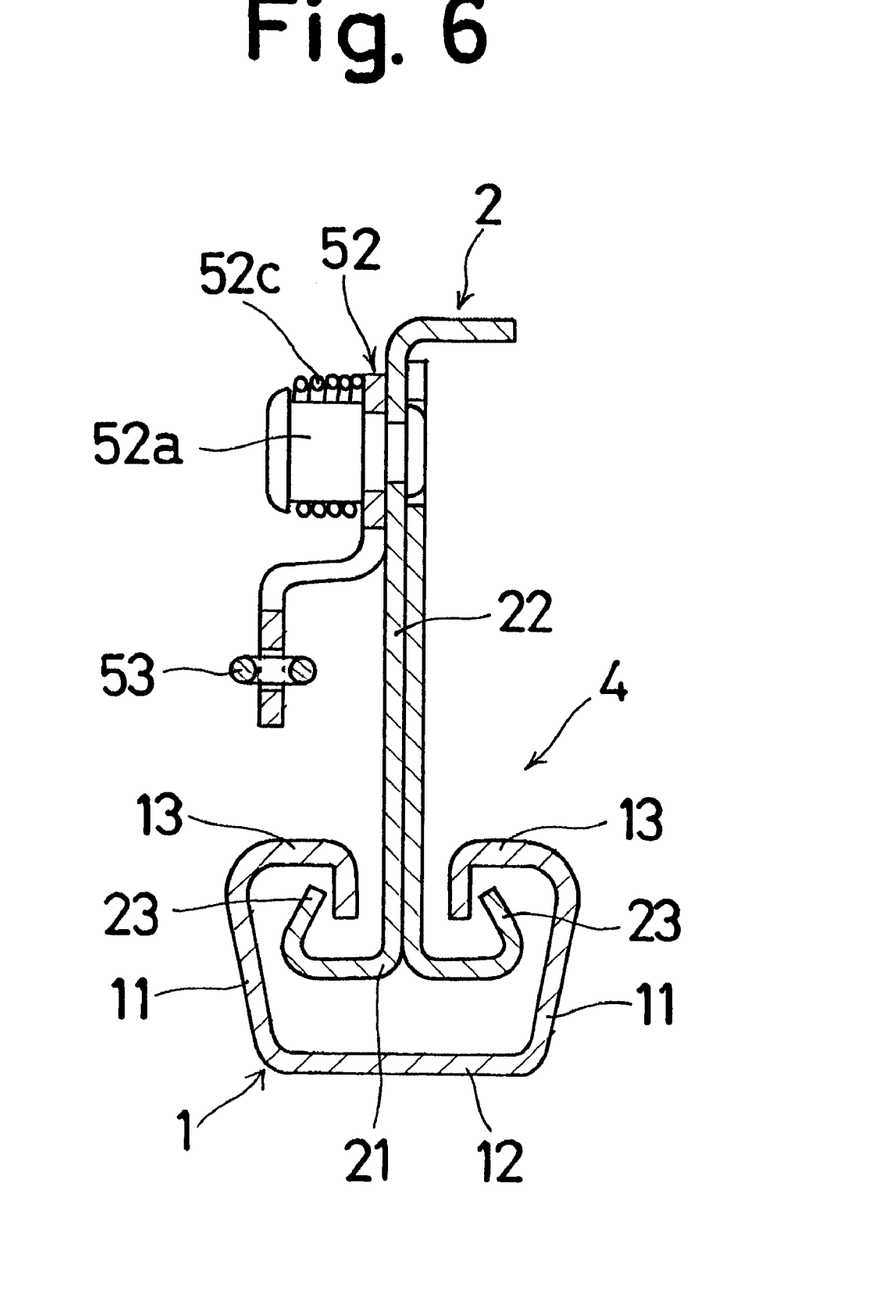
FIG. 6 is a cross-sectional view of a portion of the seat slide device in the region of the release lever.
Figure 7:
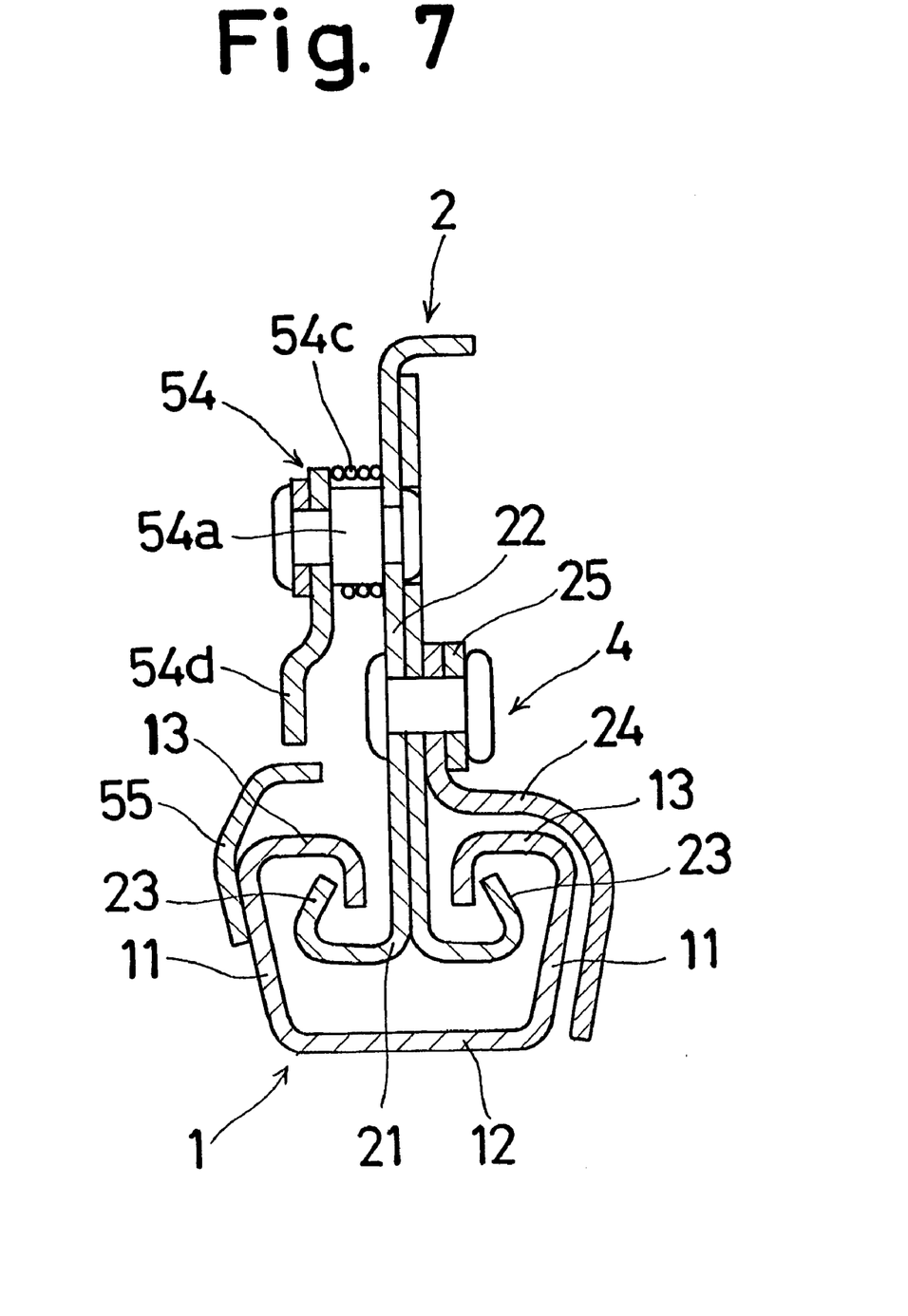
FIG. 7 is a cross-sectional view of a portion of the seat slide device in the region of the hold lever of the walk-in device shown in FIG. 3.

The seat slide device 4 comprising the lower rails 1 and the upper rails 2 is adapted to allow the vehicle seat 3 to be adjustable back and forth with respect to the longitudinal direction of the vehicle. As shown in FIG. 3 and FIG. 5, a spring 42 is installed between the front end of the lower rail 1 and the rear end of the upper rail 2. The spring 42 applies a force which pulls the upper rail 2 in the forward direction.

As shown in FIG. 3 and FIG. 4, on each inner side of the side wall portions 11 of the lower rails 1, referring to the seat width direction (i.e., the right and left side in FIG. 4), a series of engagement openings 11a is formed. The openings 11a are formed with a predetermined spacing or distance between adjacent openings. A pair of penetration openings 13a are formed on each of the inner engagement flange portions 23 of each upper rail 2, referring to the seat width direction. The height of the penetration openings 13a match or equal the height of the engagement openings 11a. A pair of auxiliary plates 24 is fixed on each inner side of the vertical portions 22 of each upper rail 2, referring to the seat width direction. The auxiliary plates 24 have engagement openings 24a having a height position matching the engagement openings 11a. A lock bracket 25 is fixed on the upper rail 2 together with the auxiliary plate 24. A lock plate 26 is pivotally held on the lock bracket 25 by a pin 25a. The lock plate 26 possesses engagement teeth 26a which penetrate through the engagement openings 24a and the penetration openings 13a, and further are adapted to engage the engagement openings 11a. The lock plate 26 is biased by a spring 25b that is set on the pin 25a. The lock plate 26 is biased by the spring 25b in the clockwise direction in FIG. 4 to cause the engagement teeth 26a to engage the engagement openings 11a. Thus the engagement teeth 26a are supported by the engagement openings 24a and the penetration openings 13a located on both sides of the engagement openings 11a. Because the engagement teeth 26a are held at two portions by the penetration openings 13a and the engagement openings 24a, high lock strength can be achieved. An engagement flange portion 26b is formed on and extends from the lock plate 26 on a side opposite the engagement teeth 26a with respect to the pin 25a.

Figure 8:
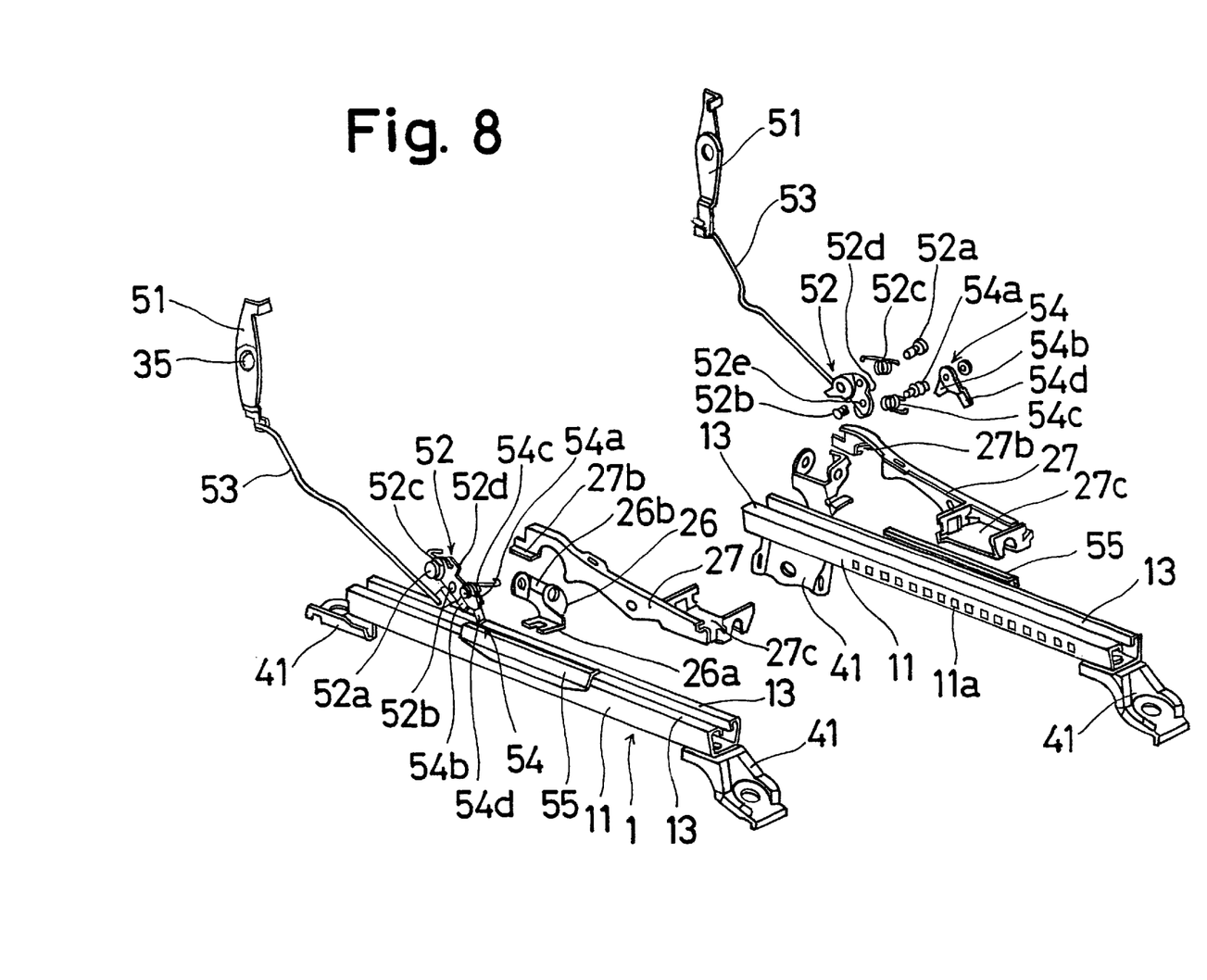
FIG. 8 is a exploded perspective view of the walk-in device in accordance with the present invention.

As shown in FIGS. 1 and 8, an operation lever 27 is pivotally held by a pin 27a on the inner face (referring to the seat width direction) of the vertical wall portion 22 of each upper rail 2. A flange portion 27b is formed on the rear end of the operation lever 27. An operation handle 43 is fixedly inserted into a hold portion 27c of the operation lever 27. To make the two operating levers 27 on both sides of the seat slide device operate together, an operation handle 43 is formed as a so-called loop handle. The operation handle 43 is arranged under the seat front edge and is fixed with the left and right side operating levers 27. The engagement flange portion 27b faces the other engagement flange portion 26b, and is adapted to engage the engagement flange portion 26b at its lower portion. The operating lever 27 is biased by a spring 27d to space the engagement flange portion 27b from the engagement flange portion 26b. The spring 27d is arranged on a pin 27a and biases the operating lever 27 in the counter clockwise direction in FIG. 3.

By virtue of the engagement between the engagement teeth 26a of the lock plate 26 and the engagement opening 11a of the lower arm 11, the slide operation of the upper rail 2 on the lower rail 1 is limited or prevented so that the position of the seat 3 is held or fixed. By operating the operation handle 43, the operating lever 27 rotates against the force of the spring 27d, the engagement flange portion 27b contacts the engagement flange portion 26b and the lock plate 26 is thus rotated against the biasing force of the spring 25b. Thus, the engagement between the teeth portion 26a and the engagement openings 13a is released and so the upper rail 2 is able to freely slide on the lower rail 1. In this way, the position of the seat is adjustable.

As shown FIGS. 1 and 2, left and right lower arms 33 are fixed in a facing and parallel relationship to each other on the rear ends of respective frames 31. Also, left and right upper arms 34 are fixed in a facing and parallel relationship to each other on the lower portions of frames (not shown) which configure the seat back of the seat 3, and are supported pivotally by the lower arm 33. Pivot axles 35 are each supported on and penetrate one of the lower arms 33 and one of the upper arms 34. Ratchets 34a are formed on each of the upper arms 34. The ratchets 34a are formed along an arc having its center on the pivot axles 35. The lower arms slidably support pawls 33a which are adapted to engage with the ratchet 34a. A cam member 35a is pivotally supported on each axle 35 and contacts one of the pawls 33a. The contact of the pawl 33a by the cam member 35a applies a thrust force to the pawl 33a and maintains a meshing engagement between the ratchet 34a and pawl 33a. An operation handle 35b is fixed on the axle 35 and a connecting shaft 35c connects both of the axles 35c so that the axles 35c rotate together.

The seat reclining device 36 comprises the lower arm 33, the upper arm 34 and the axle 35, and adjusts the reclining angle of the seat back relative to the seat cushion. Between the lower arm 33 and the upper arm 34, a spring 37 is arranged to apply a spring force to recline or pivot the upper arm 34 forward.

The rotation of the upper arm 34 with respect to the lower arm 33 is controlled by the meshing engagement between the pawl 33a and the ratchet 34a. This engagement causes the seat back angle relative to the seat cushion to be held. By operating the operation handle 35b, the axles 35 rotate, the contact between the pawl 33a and the cam 35a is released, the pawl 33a slides, and the meshing engagement between the pawl 33a and the ratchet 34a is released. The rotation of the upper arm 34 relative to the lower arm 33 is thus made possible. The position of the seat back relative to the seat cushion, or the seat back angle, is thus adjustable. The operation handle 35b has an extended portion for permitting hand operation from the front side of the seat as well as foot operation from the rear of the seat.

Figure 9:
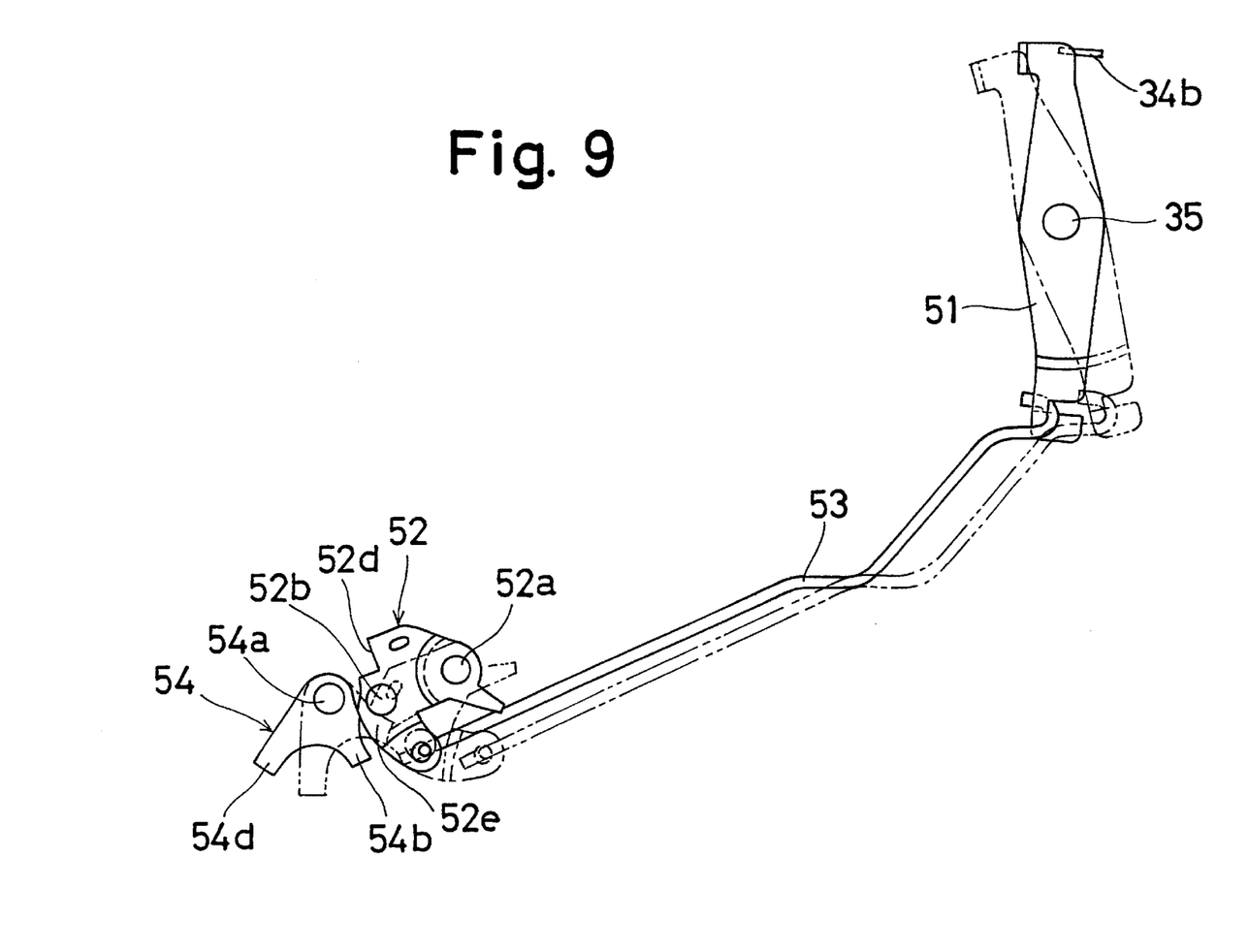
FIG. 9 is a front view of the walk-in device in accordance with the present invention.

As shown in FIGS. 1, 2 and 9, a pair of reclining plates 51 are provided, each of which is pivotally supported on a respective one of the axles 35. On the outer side vertical wall portions 22 of the upper rails 2 (with reference to the seat width direction), a release lever 52 is pivotally held by a pin 52a. One end of each reclining plate 51 is arranged to engage a bracket 34b fixed on the upper arm 34 when the upper arm 34 rotates forward towards the lower arm 33 beyond a predetermined angle. The reclining plate 51 is rotated on the axle 35 by engagement with the bracket 34b. The other end of the reclining plate 51 is connected with the release lever 52 by a rod 53. On the release lever 52, an engagement pin 52b fixedly stands or is secured in facing relation to the vertical wall portion 22 of the upper rail 2. The engagement flange portion 27b of the operation lever 27 extends through the opening 22a on the vertical wall portion 22 of the upper rail 2. The upper face of the engagement flange portion 27b of the operation lever 27 is able to contact the engagement pin 52b. The release lever 52 is biased to move the engagement pin 52b away from the engagement flange portion 27b by a spring 52c arranged on the pin 52a.

On the outer side of each upper rail 2 vertical wall portion 22, referring to the seat width direction, a hold lever 54 is pivotally held by a pin 54a. As shown in FIG. 9, the release lever 52 has an edge face at the same height level as the edge face of the hold lever 54. A shoulder portion 52d and projected portion 52e are formed on the outer edge face of the release lever 52 which faces the hold lever 54. An arm portion 54b which is adapted to engage the shoulder portion 52d and is also adapted to contact the projected portion 52e is formed on the hold lever 54. The hold lever 54 is biased in the clockwise direction in FIG. 5 by a spring 54c arranged on a pin 54a to engage the arm portion 54b with the shoulder portion 52d. Then, by the arm portion 54b of the hold lever 54 and the contact between the release lever 52 and the projected portions 52e, the hold lever 54 rotation is held against the force of the spring 54c force.

On the outer side of the engagement flange portion 13 and the outer side face of the side wall portions 11 of each lower rail 1, referring to the seat width direction (i.e., the right and left side direction in FIG. 4), a memory plate 55 is fixed. A foot portion 54d of the hold lever 54 is adapted to engage the memory plate 55 and to maintain the hold lever 54 in the disengagement position with the shoulder portion 52d of the release lever 52, while the seat is in the usual sitting position.

The walk-in operation associated with the seat slide device of the present invention is as follows. As shown in FIG. 9, during the forward folding operation when the seat back is reclined forward towards the seat cushion beyond a predetermined angle, the bracket 34b of the upper arm 34 contacts the reclining plate 51, thus causing the reclining plate 51 to rotate in the counter clockwise direction in FIG. 9. The rod 53 is thus pulled rearward by the rotation of the reclining plate 51 and the release lever 52 rotates in the counter clockwise direction in FIG. 9 against the biasing force of the spring 52c. Then, the engagement pin 52b of the release lever 52 contacts the upper face of the engagement flange portion 27b of the operation lever 27 and pushes the engagement flange portion 27b downwardly. The operation lever 27 is thus rotated in the clockwise direction in FIG. 3 against the biasing force of the spring 27d, and the lower face of the engagement flange portion 27b contacts the engagement flange portion 26b of the lock plate 26 and pushes the engagement flange portion 26b downwardly. This causes the lock plate 26 to rotate in the counter clockwise direction in FIG. 4 against the biasing force of the spring 25b. Thus the teeth portion 26a of the lock plate 26 disengage from the engagement openings 11a of the lower rail 11 so that the upper rail moves forward on the lower rail by the biasing forced of the spring 42. The position of the seat 3 on the vehicle floor is thus adjustable.

After the foregoing operation, and after the seat has been moved to the front or forward position where the memory plate 55 does not engage with the foot portion 54d of the hold lever 54, the hold lever 54 is rotated in the counter clockwise direction in FIG. 9 by the biasing force of the spring 54c, because the contact between the projection parts 52e of the release lever 52 and the arm portion 54b of the hold lever 54 is released by the rotation of the release lever 52. The arm portion 54b engages the shoulder portion 52d of the release lever 52 and the clockwise rotation of the release lever 52 in FIG. 9 by the biasing force of the spring 52c is limited or prevented. The engagement between the engagement teeth 26a of the lock plate 26 and the engagement openings 11a of the lower arm 11 is maintained in the released condition. In this condition, the foot portion 54d of the hold lever 54 remains on the moving path of the memory plate 55.

When the seat back is returned rearward to the original upright position from the forwardly folded position, and the seat 3 is moved back along the floor to the original position, which adjusting operations can be performed simultaneously, the bracket 34b of the upper arm 34 moves away from the reclining plate 51. At the same time, the foot portion 54d of the hold lever 54 hits on the front edge of the memory plate 55, and the hold lever 54 is rotated in the clockwise direction in FIG. 9 against the biasing force of the spring 54c, with the engagement between the arm portion 54b and the shoulder portion 52d of the release lever 52 being released so that the release lever 52 rotates in the clockwise direction in FIG. 9 by the biasing force of the spring 52c. As a result, the contact between the engagement pin 52b of the release lever 52 and the upper face of the engagement flange portion 27b of the operation lever 27, and the contact between the lower face of the engagement flange 27b and the engagement flange 26b of the lock plate 26 are released, whereby the lock plate 26 rotates in the clockwise direction in FIG. 4 by the force of the spring 25b. The teeth portion 26a of the lock plate 26 thus engage with the engagement opening 11a of the lower rail 1 so that the slide operation of the upper rail 2 on the lower rail 1 is limited or prevented. The seat position is thus held at resumed position. The memory plate 55 position determines the seat 3 position on the floor.

In the usual use position of the seat, the rotation of the hold lever 54 is restricted by the engagement of the arm portion 54b and the projection portion 52e of the release lever 52. The arm portion 54d is thus kept on the outside position of the movement path of the memory plate 55. Then the chattering noise from the contact with the memory plate or the unexpected interference between the upper arm 2 does not occur.

According to the present invention, the rotation of the hold lever pivotally supported on the seat slide device is controlled by the engagement between the lock plate. By making the engagement lapping portion between the release lever be constant and also the spring force applied on them constant, the engagement or disengagement timing of them is improved to be constant. As a result, the resumed position of the seat can be constant.

The principles, preferred embodiment and modes of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims be embraced thereby.

What is claimed is:

1. A seat device for a vehicle having a vehicle floor comprising:
    a seat slide device supporting a vehicle seat relative to the vehicle floor at a position that is slidably adjustable in a back and forth direction on the vehicle floor;
    a lock plate engageable with the seat slide device to hold the seat at a position on the vehicle floor;
    a release lever rotatably supported on said seat slide device for releasing engagement of the lock plate with the seat slide device to permit sliding movement of the vehicle seat;
    a memory plate arranged on the seat slide device;
    a walk-in mechanism including a hold lever comprising a hold portion engageable with the release lever to prevent rotation of the release lever and a foot portion operable by engagement with the memory plate during sliding movement of the seat in one direction to release engagement of the hold portion with the release lever, the release lever including a projection portion on an outer edge of the release lever which faces the hold lever, the projection portion engaging the hold lever after releasing the engagement of the hold portion with the release lever to maintain the hold lever in a position in which the foot portion of the hold lever is located outside a movement path which would cause the foot portion to contact the memory plate.

2. The seat device for a vehicle according to claim 1, wherein the walk-in mechanism includes a seat reclining device for supporting a seat back of the vehicle seat with respect to a seat cushion of the vehicle seat to permit the seat back to be pivoted towards and away from the seat cushion, a reclining plate which rotates when the seat back is pivoted towards the seat cushion beyond a predetermined angle, and a rod connecting said the reclining plate with said release lever.

3. The seat device for a vehicle according to claim 2, wherein the reclining plate is pivotally supported on a frame by an axle, said frame including a bracket which engages the reclining plate when the seat back is pivoted towards the seat cushion beyond the predetermined angle.

4. The seat device for a vehicle according to claim 1, wherein the seat slide device includes a lower rail secured to the vehicle floor and an upper rail slidably supported on the lower rail, and including a spring connected to the upper rail to urge the upper rail in a forward direction with respect to the lower rail when the engagement of the lock plate with the seat slide device is released.

5. The seat device for a vehicle according to claim 1, including an operation lever rotatably mounted on the seat slide device, the release lever including an engagement pin which engages the operation lever upon rotation of the release lever to cause rotation of the operation lever so that the operation lever engages the lock plate.

6. The seat device for a vehicle according to claim 1, including a spring operatively associated with the hold lever to apply a biasing force to the hold lever.

7. A seat device for a vehicle having a vehicle floor comprising:
    a lower rail secured to the vehicle floor and an upper rail supporting a vehicle seat and slidably supported on the lower rail;
    a lock plate engageable with the upper rail to fix the upper rail with respect to the lower rail and hold the vehicle seat at a position with respect to the vehicle floor;
    a release lever rotatably supported on said seat slide device for releasing engagement of the lock plate with the upper rail to permit sliding movement of the vehicle seat;
    a spring secured to the upper rail to move the upper rail in a forward direction with respect to the lower rail when the engagement of the lock plate with the upper rail is released by the release lever;
    a memory plate arranged on the lower rail;
    a hold lever comprising a hold portion engageable with the release lever to prevent rotation of the release lever and a foot portion operable by engagement with the memory plate during sliding movement of the seat in one direction to release engagement of the hold portion with the release lever, the release lever including a projection portion on an outer edge of the release lever which faces the hold lever, the projection portion engaging the hold lever after releasing the engagement of the hold portion with the release lever to maintain the hold lever in a position in which the foot portion of the hold lever is located outside a movement path which would cause the foot portion to contact the memory plate.

8. The seat device for a vehicle according to claim 7, including a seat reclining device for supporting a seat back of the vehicle seat with respect to a seat cushion of the vehicle seat to permit the seat back to be pivoted towards and away from the seat cushion.

9. The seat device for a vehicle according to claim 8, including a reclining plate which rotates when the seat back is pivoted towards the seat cushion, and a rod connecting said the reclining plate with said release lever.

10. The seat device for a vehicle according to claim 7, wherein the vehicle seat includes a seat back that is pivotable towards a seat cushion of the vehicle seat, and including a reclining plate which rotates when the seat back is pivoted towards the seat cushion, and a rod connecting said reclining plate with said release lever.

11. The seat device for a vehicle according to claim 10, wherein the reclining plate is pivotally supported on a frame by an axle, said frame including a bracket which engages the reclining plate when the seat back is pivoted towards the seat cushion.

12. The seat device for a vehicle according to claim 7, including an operation lever rotatably mounted on the seat slide device, the release lever including an engagement pin which engages the operation lever upon rotation of the release lever to cause rotation of the operation lever so that the operation lever engages the lock plate.

13. The seat device for a vehicle according to claim 7, including a spring operatively associated with the hold lever to apply a biasing force to the hold lever.

14. The seat device for a vehicle according to claim 7, wherein said release lever includes a shoulder portion engaged by an arm portion of the hold lever when the hold lever is in the one position.

15. The seat device for a vehicle according to claim 7, wherein said hold lever moves from said one position to said another position as said upper rail moves forwardly relative to said lower rail by a biasing force associated with said spring.

* * * * *